(12) United States Patent
Le et al.

(10) Patent No.: US 7,378,346 B2
(45) Date of Patent: May 27, 2008

(54) INTEGRATED MULTI-WAVELENGTH FABRY-PEROT FILTER AND METHOD OF FABRICATION

(75) Inventors: Ngoc V. Le, Gilbert, AZ (US); Jeffrey H. Baker, Chandler, AZ (US); Diana J. Convey, Laveen, AZ (US); Paige M. Holm, Phoenix, AZ (US); Steven M. Smith, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 163 days.

(21) Appl. No.: 11/387,468

(22) Filed: Mar. 22, 2006

(65) Prior Publication Data

US 2007/0224814 A1 Sep. 27, 2007

(51) Int. Cl.
*H01L 21/302* (2006.01)
*H01L 21/461* (2006.01)

(52) U.S. Cl. .................... 438/689; 216/2; 216/67; 356/480

(58) Field of Classification Search ................. 438/689
See application file for complete search history.

(56) References Cited

U.S. PATENT DOCUMENTS

| | | | | |
|---|---|---|---|---|
| 4,293,593 | A * | 10/1981 | Yoldas | 427/106 |
| 6,120,940 | A * | 9/2000 | Poehler et al. | 429/303 |
| 6,849,562 | B2 | 2/2005 | Lang | |
| 2003/0036280 | A1 | 2/2003 | Jain | |
| 2004/0191977 | A1 | 9/2004 | Li | |
| 2005/0213183 | A9 | 9/2005 | Miles | |
| 2005/0239246 | A1 | 10/2005 | Manning | |
| 2006/0051711 | A1 | 3/2006 | Ohshima et al. | |
| 2006/0054228 | A1 | 3/2006 | Unger et al. | |
| 2007/0048625 | A1 * | 3/2007 | Nordquist et al. | 430/5 |

OTHER PUBLICATIONS

Wolffenbuttel, Reinoud, State-of-Art- in Integrated Optical Microspectrometers, IEEE Transactions on Instrumentation and Measurement, vol. 53, No. 1, pp. 197-202, Feb. 2004.
Correia, J.H., De Graaf, G.; Kong, S.H.; Bartek, M; Wolffenbuttel, R.F., Single-chip CMOS optical microspectrometer, Sensors and Actuators, 82 (2000) 191-197.

(Continued)

*Primary Examiner*—Duy-Vu Deo
*Assistant Examiner*—Patricia A. George

(57) ABSTRACT

A method is provided for forming a monolithically integrated optical filter, for example, a Fabry-Perot filter, over a substrate (10). The method comprises forming a first mirror (16) over the substrate (10). A plurality of etalon material layers (32, 34, 36, 38) are formed over the mirror (16), and a plurality of etch stop layers (42, 44, 46) are formed, one each between adjacent etalon material layers (32, 34, 36, 38). A photoresist is patterned to create an opening (54) over the top etalon material layer (38) and an etch (56) is performed down to the top etch stop layer (46). An oxygen plasma (58) may be applied to convert the etch stop layer (46) within the opening (54) to silicon dioxide (57). The photoresist patterning, etching, and applying of an oxygen plasma may be repeated as desired to obtain the desired number of levels (82, 84, 86, 88). A second mirror (72) is then formed on each of the levels (82, 84, 86, 88).

15 Claims, 2 Drawing Sheets

OTHER PUBLICATIONS

Correia, J.H.,; Bartek, M; Wolffenbuttel, R., High-Selectivity Single-Chip Spectrometer in Silicon for Operation at Visible Part of the Spectrum, IEEE Transactions on Electron Devices, vol. 47, No. 3, pp. 553-559; Mar. 2000.

Correia, J.H., De Graaf, G.; Kong, S.H.; Bartek, M; Wolffenbuttel, R.F, A CMOS Optical Microspectrometer With Light-to-Frequency Converter, Bus Interface, and Stray-Light Compensation, IEEE Transactions on Instrumentation and Measurement, vol. 50, No. 6 pp. 1530-1537, Dec. 2001.

Correia, J.H.,; Bartek, M; Wolffenbuttel, R., High-Selectivity Single-Chip Spectrometer for Operations at Visible Wavelengths, IEDM pp. 467-470 1998.

Correia, J.H., De Graaf, G.; Bartek, M; Wolffenbuttel, R.F, A Single Chip CMOS Optical Microspectrometer With Light-to-Frequency Converter and Bus Interface, IEEE Journal of Solid-State Circuits vol. 37 No. 10 pp. 1344-1347 Oct. 2002.

Dohi, Tetsuji, Matsumoto, Kiyoshi, and Shimoyama, ISAO, The Optical Blood Test Device with the Micro Fabry-Perrot Interferometer, IEEE pp. 403-406- 2004.

Noro, Makoto; Suzuki, Kentaro; Kishi, Naoki; Hara, Hitoshi; $CO_2$/ $H_2O$ Gas Sensor Using a Tunable Fabry-Perot Filter With Wide Wavelength Range. Optical MEMS Archives, Feb. 2003.

International Search Report PCT/US2007/062605 dated Sep. 28, 2007.

\* cited by examiner

INTEGRATED MULTI-WAVELENGTH FABRY-PEROT FILTER AND METHOD OF FABRICATION

FIELD OF THE INVENTION

The present invention generally relates to integrated circuit fabricating methods, and more particularly to a method of fabricating a Fabry-Perot filter in an integrated circuit.

BACKGROUND OF THE INVENTION

A Fabry-Perot interferometer is an instrument commonly used in high resolution optical spectroscopy, and as a tool for the analysis of laser radiation. Etalons are widely used in telecommunications, lasers, and spectroscopy for controlling and measuring the wavelength of light. For example, a laser beam typically comprises several discrete optical frequencies related to different modes of oscillation of the laser resonator. The Fabry-Perot interferometer can be used to determine the number of modes oscillating.

The Fabry-Perot interferometer comprises two parallel mirrors and a Fabry-Perot etalon which has certain optical resonator properties. One of the mirrors is fabricated at different distances (two or more levels) from the other mirror. Conventional spectrometers comprise a large, expensive, and complex system of lenses and mirrors. More recently, attempts have been made to manufacture a Fabry-Perot interferometer within a monolithically integrated circuit. See for example, "Single-chip CMOS optical microspectrometer", J. H. Correia et al., Sensors and Actuators, 82 (2000) 1.91-197.

These etalon fabrication of fixed cavity filters in monolithically integrated circuits include multiple timed etches for providing varying discrete levels of one mirror. However, establishing the distance of the mirror levels by a timed etch is inaccurate for dimensions involving wavelengths on the order of 400 to 1000 nanometers.

Accordingly, it is desirable to provide a method of fabricating a Fabry-Perot filter in an integrated circuit whose mirror levels may be accurately determined. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for forming a monolithically integrated optical filter, for example, a Fabry-Perot filter, over a substrate. The method comprises forming a first mirror over the substrate. A plurality of etalon material layers are formed over the mirror, and a plurality of etch stop layers are formed, one each between adjacent etalon material layers. A photoresist is patterned to create an opening over the top etalon material layer and an etch is performed down to the top etch stop layer. An oxygen plasma may be applied to convert the etch stop layer within the opening to silicon dioxide. The photoresist patterning, etching, and applying of an oxygen plasma may be repeated as desired to obtain the desired number of levels. A second mirror is then formed on each of the levels.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned.

A method of fabricating a Fabry-Perot filter for accurately measuring wavelengths comprises a series of process steps including etching to a number of etch stop layers. One or more etch stop layers of silicon carbon nitride may be converted to silicon dioxide, during the process, by the application of an oxygen plasma. Subsequent etching removes the converted silicon dioxide and an underlying oxide layer.

Figure 1:
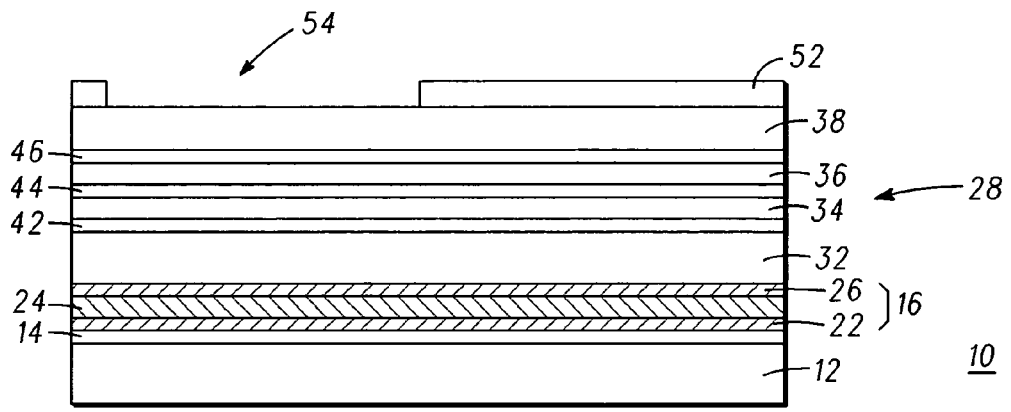
FIGS. 1-5 are partial cross sectional views of progressive steps of fabrication of an exemplary embodiment.

Referring to FIG. 1, an optional thin oxide layer 14 may be formed on a substrate 12. The oxide layer 14 may be deposited in a vacuum chamber (not shown). A first mirror 16 comprising, for example, alternating layers of titanium oxide 22, silver 24, and titanium oxide 26, is grown either on the optional oxide layer 14 or the substrate 12. The layer thicknesses of the mirror 16 typically comprise 100 Å for titanium oxide 22, 300 Å for silver 24, and 100 Å for titanium oxide 26.

Layers of an etalon material 28 include etalon layers 32, 34, 36, and 38 and comprise silicon dioxide, or other non-conductive material such as silicon oxynitride, silicon nitride, and polymer materials. First through third etch stop layers 42, 44, 46 are individually deposited on the etalon layers 32, 34, 36, respectively. The etch stop layers 42, 44, 46, preferably comprise hydrogenated silicon carbon nitride, but may comprise un-hydrogenated silicon carbon nitride. The etch stop layers 42, 44, 46, may have a thickness in the range of 50 to 5000 Å, but preferably have a thickness of 200

Å. The thickness of the etalon layers 32, 34, 36, 38 may vary depending on the application. For this exemplary embodiment, the thicknesses comprise 3900 Å for layer 32, 100 Å, for layer 34, 100 Å for layer 36, and 300 Å for layer 38. The etch stop layers 42, 44, 46, have an etch characteristic different from the etalon material 28 such that an etch removing the etalon material 28 will not etch the etch stop layers 42, 44, 46.

Figure 2:
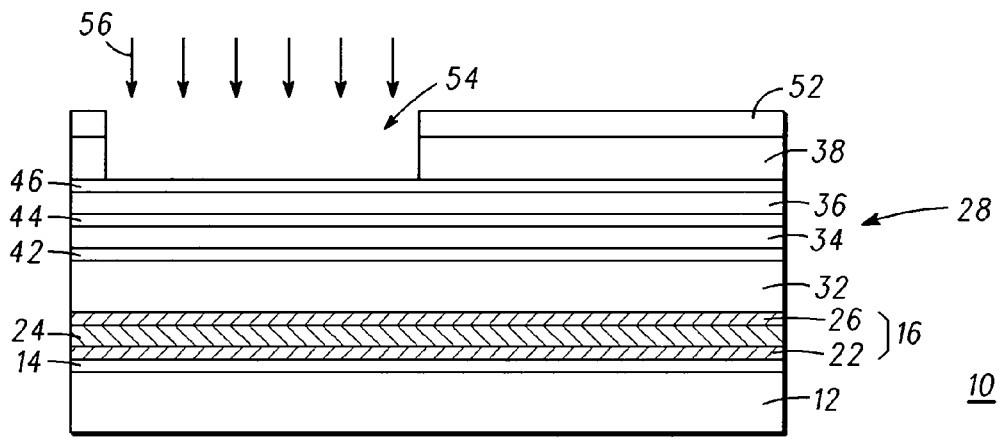
Figure 3:
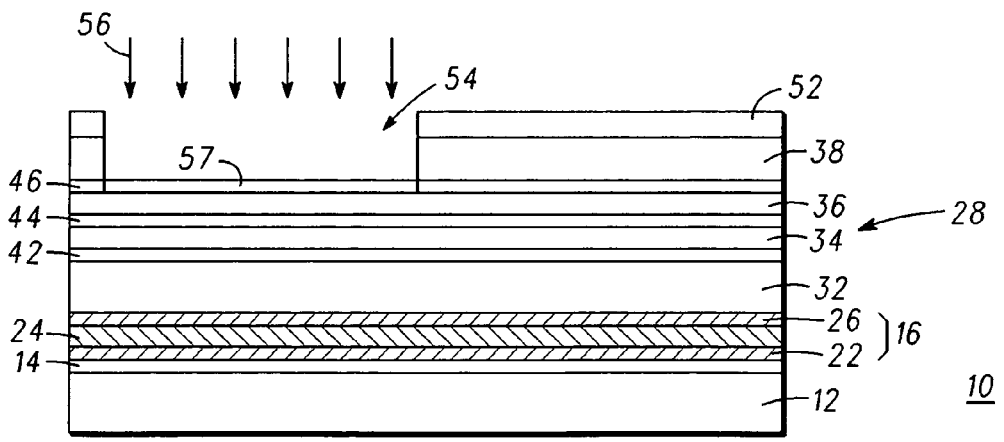
Figure 4:
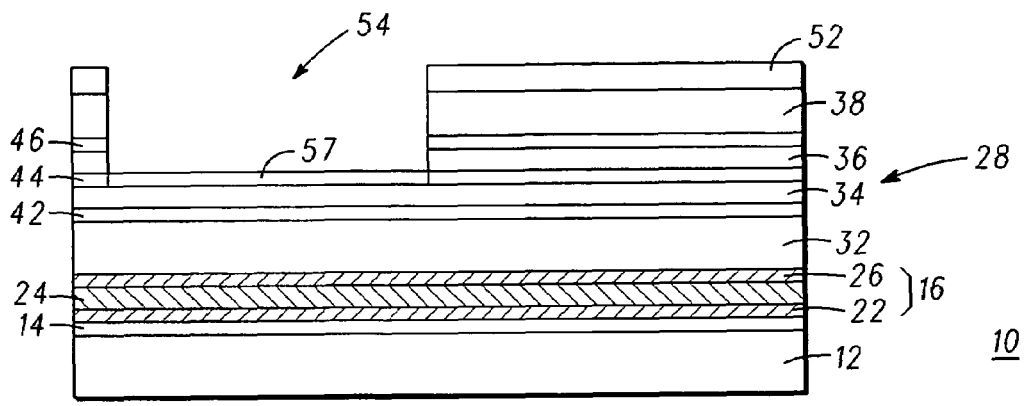

A photoresist layer 52 is formed and patterned as described above, creating an opening 54 in the photoresist layer 52. An etch 56 (see FIG. 2) is performed, removing the etalon layer 38 in the opening 54 to the etch stopping layer 46. The structure 10 is then submitted to an oxygen plasma 58 (see FIG. 3), which converts the etch stop layer 46 in the opening 54 to silicon dioxide 57. This process of an etch 56 and oxygen plasma 58 is repeated to remove etalon layer 36 and convert the etch stop layer 44, respectively (see FIG. 4). The photoresist 52 is also removed. The oxygen plasma 58 may either be applied in-situ in the etch tool prior to etching, or ex-situ, for example during the resist removal process. The etch 56 may preferably comprises of a fluorine-based plasma, but may comprise a wet chemistry such as BOE.

Figure 5:
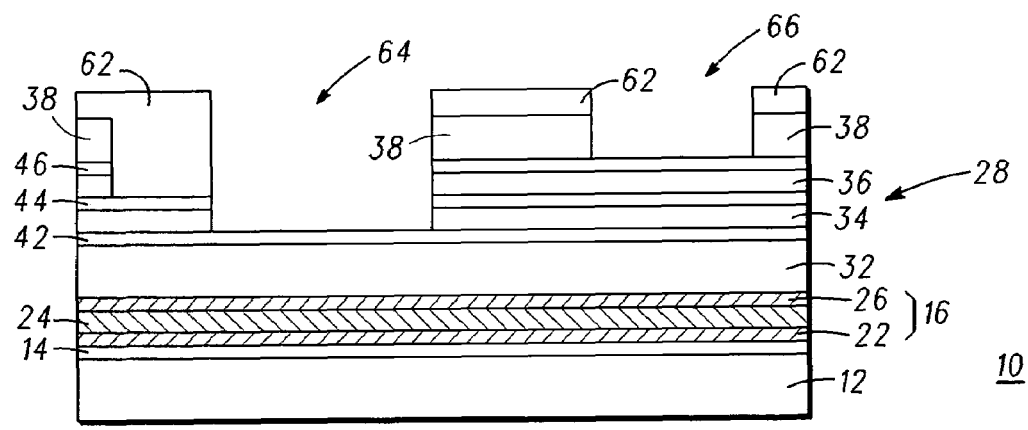

Referring to FIG. 5, a photoresist 62 is formed and patterned over the structure 10, creating openings 64 and 66. The etch 56 is repeated to remove the etalon layer 34 in opening 64, and etalon layer 38 in opening 66.

Figure 6:
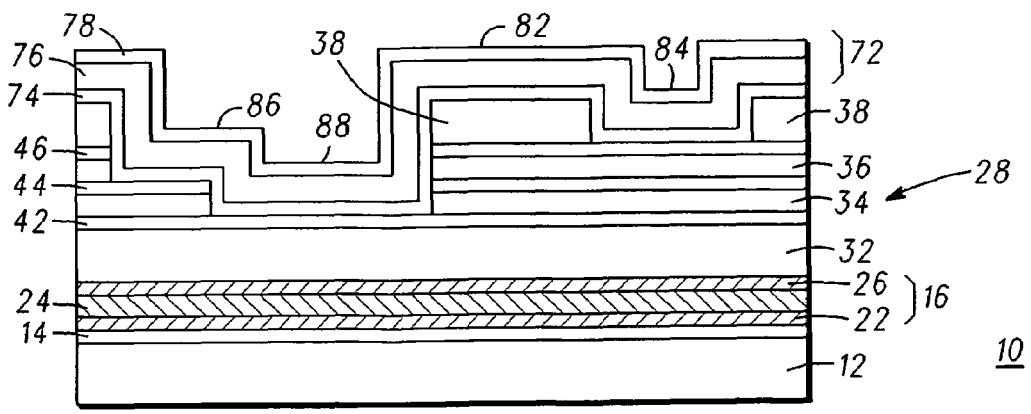
FIG. 6 is partial cross sectional view of the exemplary embodiment in a late stage of the fabrication process.

Referring to FIG. 6, the photoresist 62 is removed and a second mirror 72 comprising, for example, alternating layers of titanium oxide 74, silver 76, and titanium oxide 78, is grown on the top of the structure 10, resulting in the second mirror 72 having four distinct levels 82, 84, 86, and 88 at four distances from the first mirror 16. While this exemplary embodiment illustrates four distinct levels 82, 84, 86, and 88, any number of levels from two or more could by fabricated using this process.

A process has been disclosed to fabricate a monolithically integrated structure having two or more levels that are determined using an oxygen plasma and etch process to selectively remove a number of etch stop and etalon layers, thereby providing a more robust and manufacturable process than previously known timed etch processes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for fabricating a monolithically integrated structure, comprising:
   forming alternating layers of a material and etch stop layers formed over a substrate;
   forming a first mirror between the substrate and the alternating layers;
   forming a first patterned photoresist over the alternating layers, thereby leaving a first opening over a portion of the material in a first portion of the alternating layers;
   performing a first etch to remove the portions of the material in the first opening;
   forming a second patterned photoresist over the alternating layers, thereby leaving a second opening within the first opening and exposing one of the etch stop layers within the second opening;
   applying an oxygen plasma to convert the one of the etch stop layers in the second opening to silicon dioxide;
   performing a second etch to remove the silicon dioxide and a second portion of the material in the second opening;
   forming, subsequent to the performing a second etch, a second mirror on a side of the alternating layers opposed to the first mirror, the second mirror having at least two levels having different distances from the first mirror.

2. The method of claim 1 wherein the forming alternating layers step comprises forming layers of silicon carbon nitride as the etch stop layers.

3. The method of claim 2 wherein the applying the oxygen plasma comprises converting the silicon carbon nitride to silicon dioxide.

4. The method of claim 1 wherein the forming a first mirror and forming a second mirror comprises forming layers of titanium oxide, silver, and titanium oxide in succession.

5. A method for fabricating an optical filter on a substrate, comprising:
   forming a first mirror over the substrate;
   forming a first material over the mirror;
   forming an etch stop layer over the first material;
   forming a second material over the etch stop layer, and having a surface opposed to the substrate;
   patterning a first photoresist with an opening over a first portion of the second material;
   etching through the first portion of the second material to the etch stop layer;
   forming a second mirror having a first level over the etch stop layer and a second level over the surface.

6. The method of claim 5 further comprising:
   applying an oxygen plasma to the etch stop layer beneath the portion of the second material;
   etching through the etch stop layer and a portion of the first material; and
   wherein the forming a second mirror includes forming the second mirror over the substrate.

7. The method of claim 6 further comprising:
   patterning a second photoresist with an opening over a second portion of the second material;
   etching through the second portion of the second material to the etch stop layer;
   wherein the forming a second mirror comprises forming a second mirror having a first level over the etch stop layer, a second level over the substrate, and a third level over the surface.

8. The method of claim 6 wherein the forming an etch stop layer comprises forming a layer of silicon carbon nitride.

9. The method of claim 8 wherein applying an oxygen plasma comprises converting the silicon carbon nitride to silicon dioxide.

10. The method of claim 5 wherein the forming a first mirror and forming a second mirror both comprise forming layers of titanium oxide, silver, and titanium oxide in succession.

11. A method of fabricating a monolithically integrated Fabry-Perot filter, comprising:
    forming a first mirror over a substrate;
    forming first, second, third and fourth material layers over the mirror;

forming a plurality of etch stop layers, one each between adjacent first, second, third, and fourth material layers, the first material layer being farthest from the substrate and having a surface a first distance from and opposed to the substrate;

patterning a first photoresist to create a first opening over the surface;

etching to remove the first material layer beneath the first opening to one of the etch stop layers having a second distance from the substrate;

applying a first oxygen plasma to convert the etch stop layer beneath the first opening to silicon dioxide;

etching to remove the second material layer beneath the first opening to another one of the etch stop layers having a third distance from the substrate patterning a second photoresist to create a second opening over a portion of the another one of the etch stop layers and a third opening over the surface;

etching to remove the material layers beneath the second and third openings; and forming a second mirror in the each of the first, second, and third openings.

12. The method of claim 11 wherein the forming an etch stop layer comprises forming a layer of silicon carbon nitride.

13. The method of claim 12 wherein applying an oxygen plasma comprises converting the silicon carbon nitride to silicon dioxide.

14. The method of claim 11 wherein the forming a first mirror and forming a second mirror both comprise forming layers of titanium oxide, silver, and titanium oxide in succession.

15. A method for forming a monolithically integrated optical filter over a substrate, comprises:

forming a first mirror over the substrate;

forming a plurality of material layers over the mirror;

forming a plurality of etch stop layers, one each between adjacent material layers;

patterning a photoresist to create an opening over the material layer farthest from the substrate;

etching through the material layer to an etch stop layer;

applying an oxygen plasma to convert the etch stop layer within the opening to silicon dioxide;

repeating the patterning, etching, and applying steps as desired to obtain a number of levels; and forming a second mirror on each of the levels.

* * * * *